(12) United States Patent
Bacelos et al.

(10) Patent No.: US 11,865,749 B2
(45) Date of Patent: Jan. 9, 2024

(54) METHOD FOR MANUFACTURING BY INJECTION, A PART MADE OF A PLASTIC MATERIAL INCLUDING A TECHNICAL FACE INCORPORATION A REINFORCING ELEMENT

(71) Applicant: NOVARES France, Clamart (FR)

(72) Inventors: François Bacelos, Nice (FR); Alain Mevil-Blanche, Menton (FR); Louis Asensio, Menton (FR)

(73) Assignee: NOVARES FRANCE, Clamart (FR)

( * ) Notice: Subject to any disclaimer, the term of this patent is extended or adjusted under 35 U.S.C. 154(b) by 767 days.

(21) Appl. No.: 16/348,064

(22) PCT Filed: Nov. 7, 2017

(86) PCT No.: PCT/FR2017/053032
§ 371 (c)(1),
(2) Date: May 7, 2019

(87) PCT Pub. No.: WO2018/087463
PCT Pub. Date: May 17, 2018

(65) Prior Publication Data
US 2019/0275716 A1 Sep. 12, 2019

(30) Foreign Application Priority Data
Nov. 8, 2016 (FR) ...................... 16/60805

(51) Int. Cl.
*B29C 45/14* (2006.01)
*B29K 23/00* (2006.01)
(Continued)

(52) U.S. Cl.
CPC .. *B29C 45/14065* (2013.01); *B29C 45/14631* (2013.01); *B29C 45/14786* (2013.01);
(Continued)

(58) Field of Classification Search
CPC .... B29C 2045/14106; B29C 45/14631; B29C 2045/14114; B29C 45/14065
See application file for complete search history.

(56) References Cited

U.S. PATENT DOCUMENTS 9,884,459 B2 * 2/2018 Hubauer ............. B29C 45/1671
10,099,409 B2 * 10/2018 Kuroki .................... B29C 39/10
(Continued)

FOREIGN PATENT DOCUMENTS

| CN | 106042262 A | 10/2016 |
| DE | 102011120986 A1 | 6/2013 |
| EP | 3078475 A1 | 10/2016 |

OTHER PUBLICATIONS

Yu et al. "A Simplified In-Plane Permeability Model for Textile Fabrics." Polymer Composites, Oct. 2000, vol. 27, No. 5 (Year: 2000).*

(Continued)

*Primary Examiner* — Matthew J Daniels
*Assistant Examiner* — Hana C Page
(74) *Attorney, Agent, or Firm* — CANTOR COLBURN LLP

(57) ABSTRACT

This process for manufacturing a plastic part (1) having a first technical face and a second face, in a mold comprising a first shell intended to form the first face endowed with impressions intended to form technical members of the technical face and a second shell intended to form the second face, the first shell and the second shell delimiting a cavity that forms the part (1), comprises the following steps:—providing a porous reinforcing element (3);—draping the reinforcing element (3) over the first shell by covering the surface of the first shell and the impressions intended to form the technical members;—retaining the reinforcing element (3) on the first shell by retaining means;—bringing the first shell and the second shell together;—injecting a plastic in (Continued)

order to fill the cavity, the plastic passing through the porous reinforcing element (3) in order to fill impressions intended to form the technical members;—moving the first and second shells apart;—ejecting the plastic part (1).

9 Claims, 6 Drawing Sheets

(51) Int. Cl.
  *B29K 55/02* (2006.01)
  *B29K 277/00* (2006.01)
  *B29L 31/30* (2006.01)
  *B60R 13/02* (2006.01)

(52) U.S. Cl.
  CPC ............... *B29C 2045/14106* (2013.01); *B29C 2045/14114* (2013.01); *B29K 2023/12* (2013.01); *B29K 2055/02* (2013.01); *B29K 2277/00* (2013.01); *B29K 2313/00* (2013.01); *B29L 2031/3038* (2013.01); *B29L 2031/3041* (2013.01); *B60R 13/02* (2013.01)

(56) References Cited

U.S. PATENT DOCUMENTS

| | | | | |
|---|---|---|---|---|
| 10,843,389 | B2* | 11/2020 | Weis | B29C 45/14631 |
| 2003/0075908 | A1* | 4/2003 | Rink | C06D 5/00 |
| | | | | 280/736 |
| 2009/0253362 | A1* | 10/2009 | Krobok | B61D 33/00 |
| | | | | 454/120 |
| 2012/0292817 | A1* | 11/2012 | Deckert | B29C 45/14688 |
| | | | | 264/275 |
| 2015/0102524 | A1 | 4/2015 | Hubauer | |
| 2016/0297123 | A1 | 10/2016 | Weis et al. | |

OTHER PUBLICATIONS

International Search Report for Application No. PCT/FR2017/053032.
Written Opinion for Application No. PCT/FR2017/053032.
English Machine Translation Abstract of DE102011120986.
Chinese Office Action for Application No. 201780069169.4.
French Search dated Jun. 9, 2017; French Application No. 1660805; 2 pages.
French Written Opinion dated Jun. 9, 2017; French Application No. 1660805; 5 pages.
Supplementary Chinese Search dated Jun. 16, 2022; Chinese Application No. 201780069169.4; 2 pages.
Third Chinese Office Action dated Jun. 24, 2022; Chinese Application No. 201780069169.4; 6 pages (non-English).
Third Chinese Office Action dated Jun. 24, 2022; Chinese Application No. 201780069169.4; 8 pages (English translation).

* cited by examiner

METHOD FOR MANUFACTURING BY INJECTION, A PART MADE OF A PLASTIC MATERIAL INCLUDING A TECHNICAL FACE INCORPORATION A REINFORCING ELEMENT

CROSS REFERENCE TO RELATED APPLICATIONS

This application is a National Stage of PCT Application No. PCT/FR2017/053032 filed on Nov. 7, 2017, which claims priority to French Patent Application No. 16/60805 filed on Nov. 8, 2016, the contents each of which are incorporated herein by reference thereto.

TECHNICAL FIELD

The present invention concerns a method for manufacturing a part made of a plastic material for a motor vehicle.

BACKGROUND

A motor vehicle comprises a large number of parts made of a plastic material which may be found either outside the vehicle (parts such as side protection strips, bumpers, spoilers . . . ) or in the engine compartment (parts such as air distributors, cylinder head covers, oil sump, . . . ), or in the passenger compartment of the vehicle (parts such as interior trims, dashboard elements, seat elements, . . . ).

These parts may be subjected to severe mechanical stresses throughout their life cycle and, in case of breakage, can create a risk for the passengers of the vehicle or persons in the vicinity of the vehicle.

Indeed, in case of breakage of a part made of a plastic material, it is necessary to prevent that the latter is ejected or splits into multiple sub-elements that are likely to injure the passengers of the vehicle, persons present in the vicinity of the vehicle or to damage other safety components.

The breakage of a part made of a plastic material, for example in the passenger compartment, may in particular occur in case of deployment of an airbag.

Conventionally, the airbag is masked by a part called interior trim made of a plastic material. It may be provided that the interior trim part that masks an airbag is provided with controlled score lines which enable the deployment of the airbag. However, it is quite deleterious that the interior trim splits uncontrollably during the deployment of an airbag.

Yet, current vehicles are provided with a large number of airbags that are found at the level of the steering wheel, the dashboard, the side walls of the vehicle each being masked by an interior trim part made of a plastic material. In case of an accident of a vehicle causing the deployment of airbags, it is understood that each of the airbags can be the source of an uncontrolled breakage and, potentially, dangerous for a passenger, of interior trim parts that mask the airbags.

Moreover, for the purpose of enhancing the passengers safety, safety standards are becoming increasingly stringent: the airbags may have increasingly large air volumes or may be propelled by larger explosive charges to be deployed more quickly. This contributes to increasing the passengers safety but solicits more strongly the interior trim parts and therefore increases the risk of uncontrolled breakage of these same parts because of the higher applied loads.

If the interior trim part is defined by its apparent face which is turned towards the passenger compartment and, by its technical face opposite to the apparent face and therefore, facing the airbag, it is known to reinforce a interior trim part by affixing reinforcing elements on its technical face.

The considered reinforcing elements may be in the form of films, adhesive patches or overmolded patches which therefore double the technical face to enable it to avoid the ejection of plastic parts fragments subsequently to the deployment of the airbag.

In practice, the reinforcement of the technical face poses considerable technical difficulties.

In the first place, the deposition of the reinforcing patches is complex to implement because the positioning and the holding of these patches in a tooling for molding plastic parts is difficult to guarantee and to replicate. The positioning and the holding in the molding tooling require complex kinematics and mechanical means to provide in the molding tooling (needles, suction . . . ).

In the second place, the deposition of a reinforcing film is complex because the technical face is provided with technical members. Unlike the apparent face which is smooth, the technical face is on the contrary provided with technical members such as fastening clips, fastening staples holders or reinforcing ribs which require that the reinforcing film must circumvent these technical members to double the technical face. The coverage of the entire technical face by the reinforcing film turns out to be impossible, the reinforcing film can cover only but some areas of the technical face.

Knowing that the reduction of the thickness of interior trim parts is more and more pursued for weight reduction reasons in order to reduce vehicles consumption, it appears that the management of parts made of a plastic material having to undergo strong mechanical stresses is not satisfactory.

BRIEF DESCRIPTION

In this technical context, the invention proposes to provide a solution to the problem of making parts made of a plastic material having to undergo heavy mechanical loads.

The invention concerns a method for manufacturing a part made of a plastic material having a first technical face and a second face, in a tooling comprising a first shell intended to form the first face, provided with imprints intended to form technical members of the technical face and a second shell intended to form the second face, the first shell and the second shell delimiting a cavity forming the part, characterized in that the method comprises the following steps of:
  Providing a porous reinforcing element;
  Drape-molding the reinforcing element on the first shell by covering the surface of the first shell and the imprints intended to form the technical members;
  Retaining the reinforcing element on the first shell by retaining means;
  Bringing the first shell and the second shell close to each other;
  Injecting a plastic material to fill the cavity, the plastic material passing through the porous reinforcing element to fill imprints intended to form the technical members;
  Separating the first and second shells;
  Ejecting the plastic part.

Thus, the invention provides a method allowing making a part having a complex shape and provided with technical members which incorporates a reinforcing element. In particular, the method according to the invention provides for a positioning and a retention of the reinforcing element in the mold which confers to the method a high repeatability. Furthermore, the implementation of a porous reinforcing element allows, during the plastic material injection operation, to filling imprints which will form technical members, which authorizes complete drape-molding of the technical face of the part.

Preferably, the reinforcing element comprises a woven textile having an opening coefficient of 50%.

Furthermore, the textile may be a polyamide-based textile having a basis weight in the range of 60 g/m².

According to an embodiment of the invention, the retention of the porous reinforcing element is achieved by an adhesive interposed between the porous reinforcing element and the first shell.

In a first variant, the adhesive is deposited over the reinforcing element, the reinforcing element then being positioned on the first shell.

According to another variant, the adhesive is deposited over the first shell, the reinforcing element then being positioned on the first shell.

Preferably, the adhesive is formed based on an aqueous adhesive.

According to another embodiment, the retention of the reinforcing element on the first shell is achieved by electrostatic means.

According to another embodiment, the retention of the reinforcing element on the first shell is achieved by electromagnetic means.

Preferably, the second face of the part constitutes its apparent face which can be turned towards the passenger compartment of the vehicle.

BRIEF DESCRIPTION OF THE DRAWINGS

For a proper understanding, the invention is described with reference to the appended drawings representing as a non-limiting example one embodiment of the invention.

DETAILED DESCRIPTION

Figure 1:
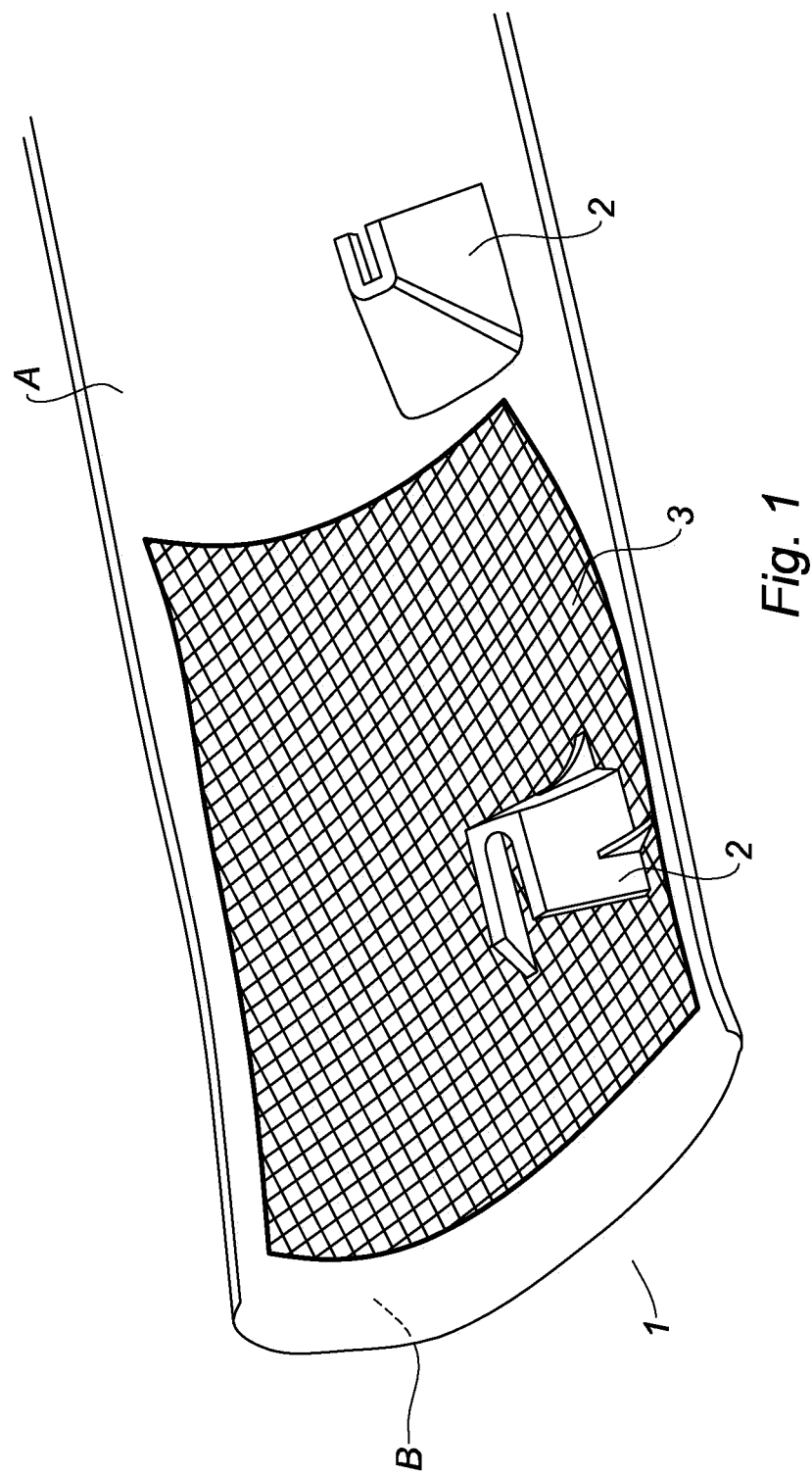
FIG. 1 shows in perspective a part made of a plastic material intended to equip a motor vehicle.

FIG. 1 shows a interior trim part 1 intended to ensure the interior lining of the passenger compartment of a vehicle. While the invention is described with reference to a interior trim part, the invention concerns all parts made of a plastic material intended to be embedded on a motor vehicle.

The interior trim part 1 has a first face and a second face opposite to the first face.

The first face is called technical face A, which carries a number of technical members such as, for example, fastening clips, staple holders 2 or networks of ribs and the second face called apparent face B, that faces the passenger compartment.

As shown in FIG. 1, the interior trim part 1 has a relatively complex clumsy general shape which is preferably made of a thermoformable material and in particular thermoplastic material such as, for example, polypropylene or ABS-PC.

Figure 2:
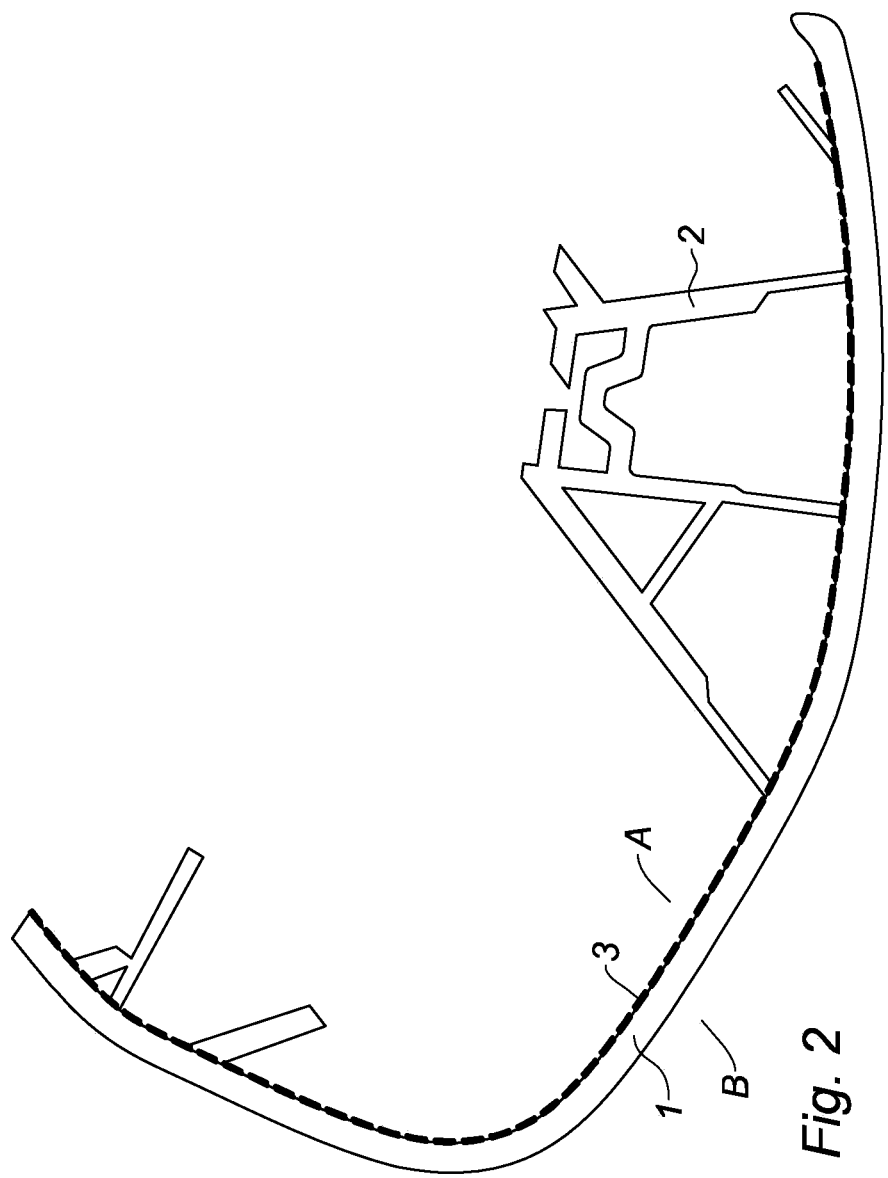
FIG. 2 shows in section a part made of a plastic material according to the invention.

FIG. 1 and FIG. 2 show an important feature of the interior trim part 1 according to the invention, which is the presence of a reinforcing element 3 which is drape-molded over the entire technical surface A, with the exception in the example represented in FIG. 1 of a strip limited to a few millimeters of the piece border edges.

The reinforcing element 3 is constituted by a porous material which, as will be seen later on, enables the plastic material that forms the interior trim part 1 to flow throughout this same reinforcing element 3 during the injection.

The reinforcing element may be, for example, formed by a polyamide-based woven textile having a basis weight of 60 g/m² and a thickness of 180 micrometers.

Figure 3:
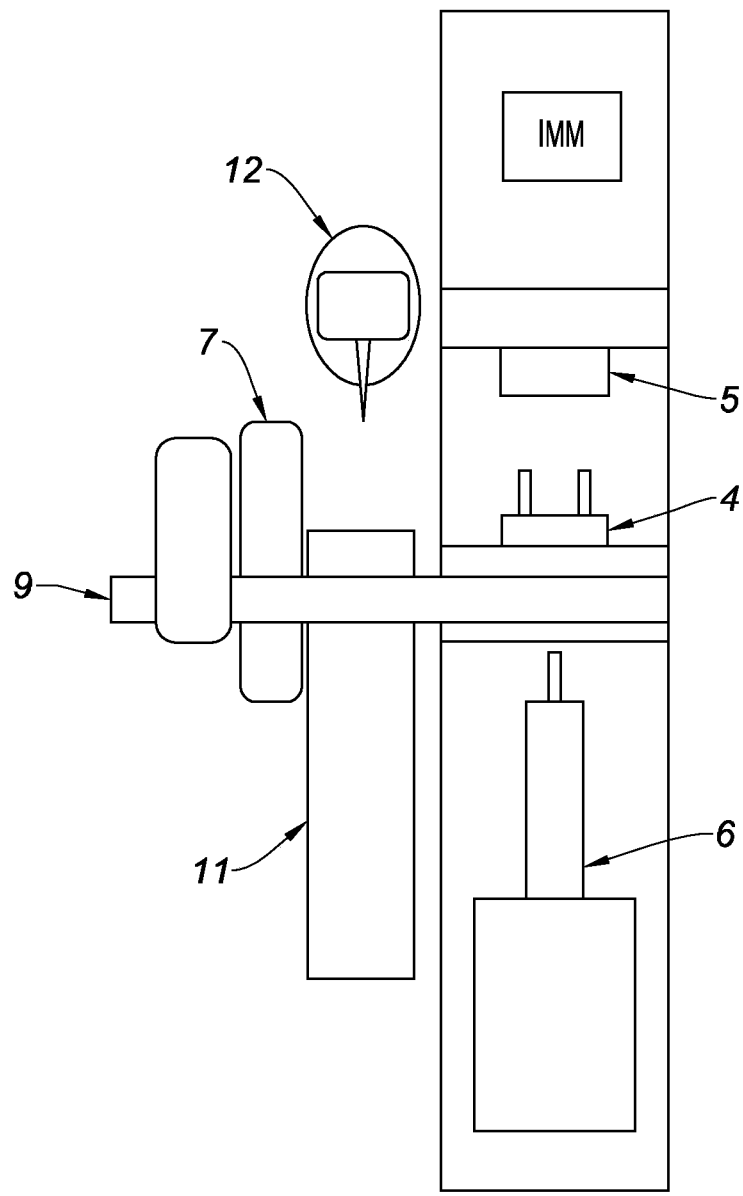
FIGS. 3 to 8 show the steps of manufacturing the part shown in FIGS. 1 and 2 of the method according to the invention.

The method which allows making the interior trim part 1 is implemented in a conventional injection-molding tooling which is shown in FIG. 3 and which comprises a fixed shell 4 and a movable shell 5 between which is defined a cavity which forms the part to be molded. The tooling is equipped with an injection unit 6 upstreams and a conveyor 11 for the finished parts downstreams.

The method comprises the following steps.

The reinforcing element 3 may be initially packaged into a roll or into a stack of individual portions.

Figure 4:
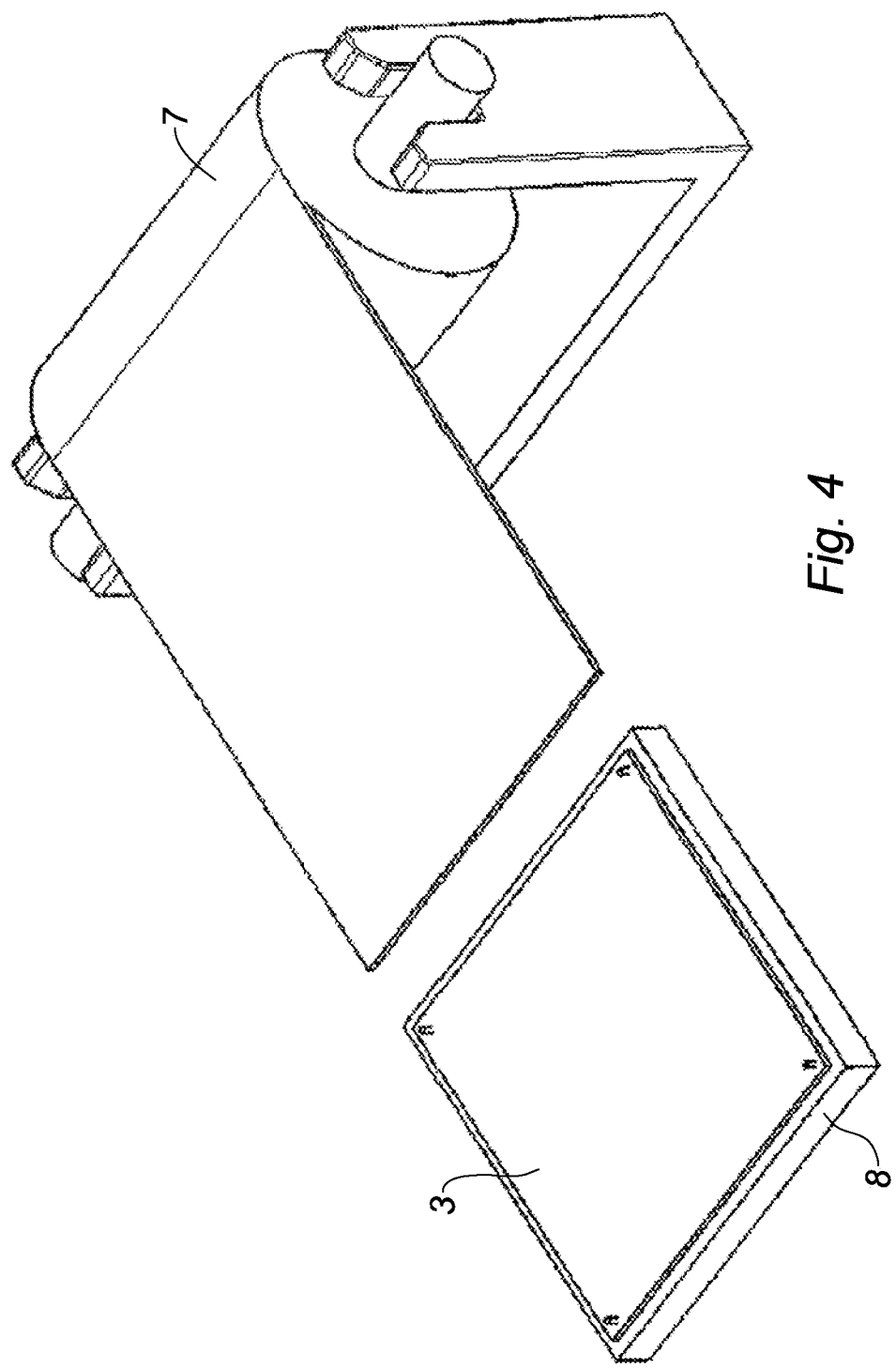

Initially as shown in FIG. 4, the reinforcing element 3 which, in the example represented in this figure, originates from a roll 7 is deposited over a table 8.

Figure 5:
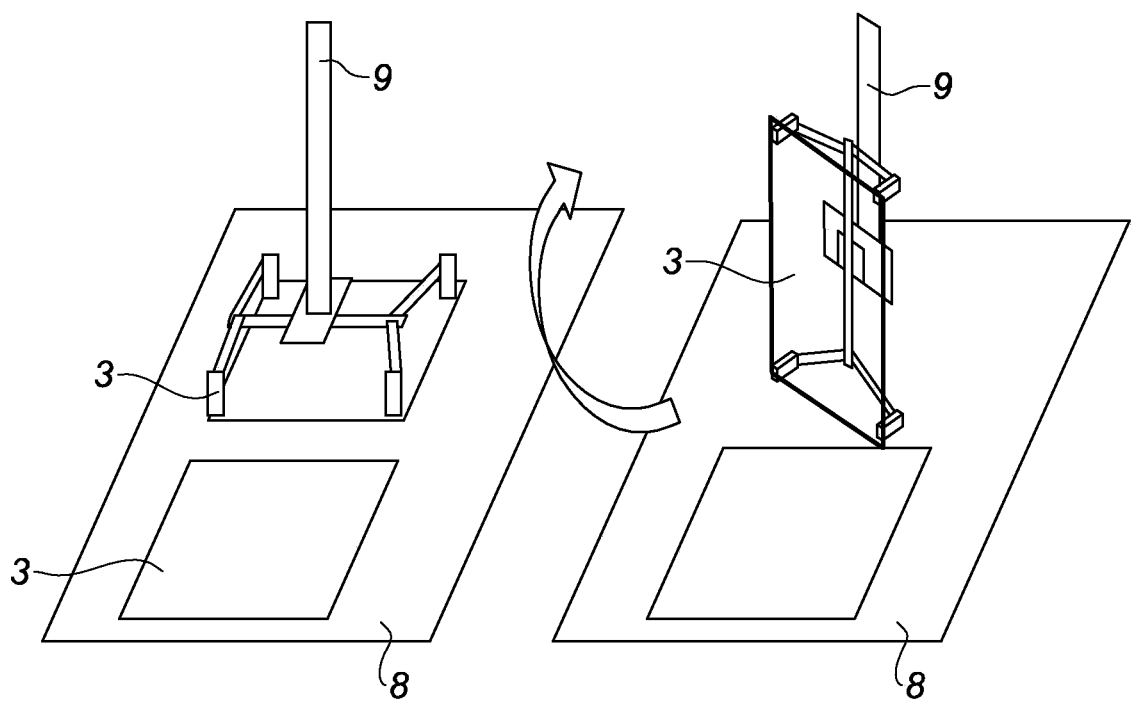

From its position on the table 8, the reinforcing element 3 may be displaced by a gripper arm 9 as shown in FIG. 5.

Figure 6:
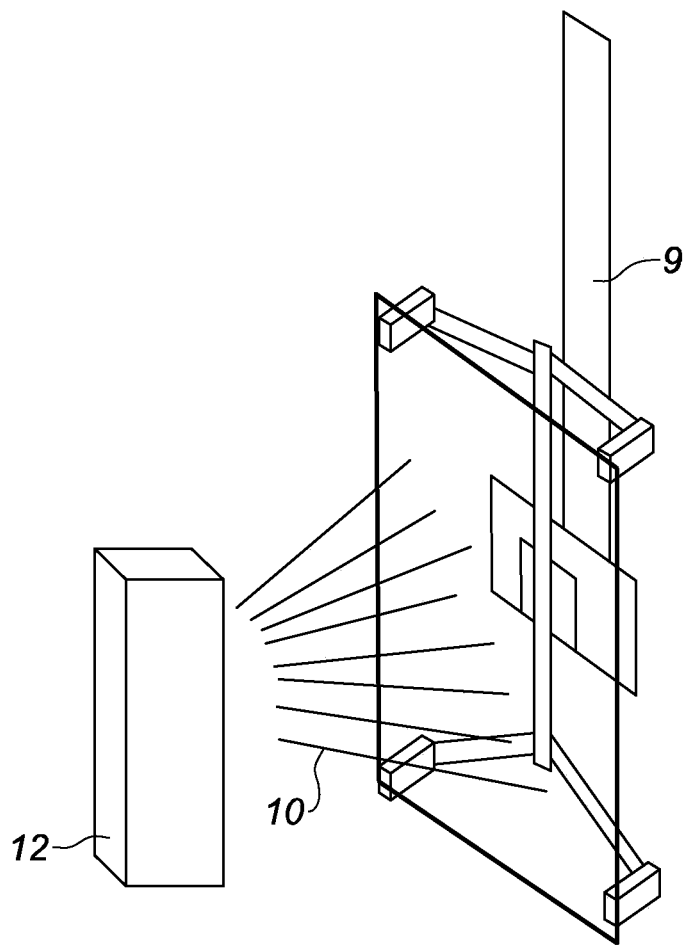

The reinforcing element 3 is coated with an adhesive 10. Preferably, the adhesive 10 consists of an aqueous glue which can be deposited over the reinforcing element 3 by spraying by a spraying system 12 as illustrated in FIG. 6. The adhesive 10 may also be deposited by roll coating.

In one embodiment, the reinforcing element 3 may be pre-glued.

A partial drying phase of the adhesive film follows. This drying phase may take place in ambient air or may be accelerated by heat input.

Figure 7:
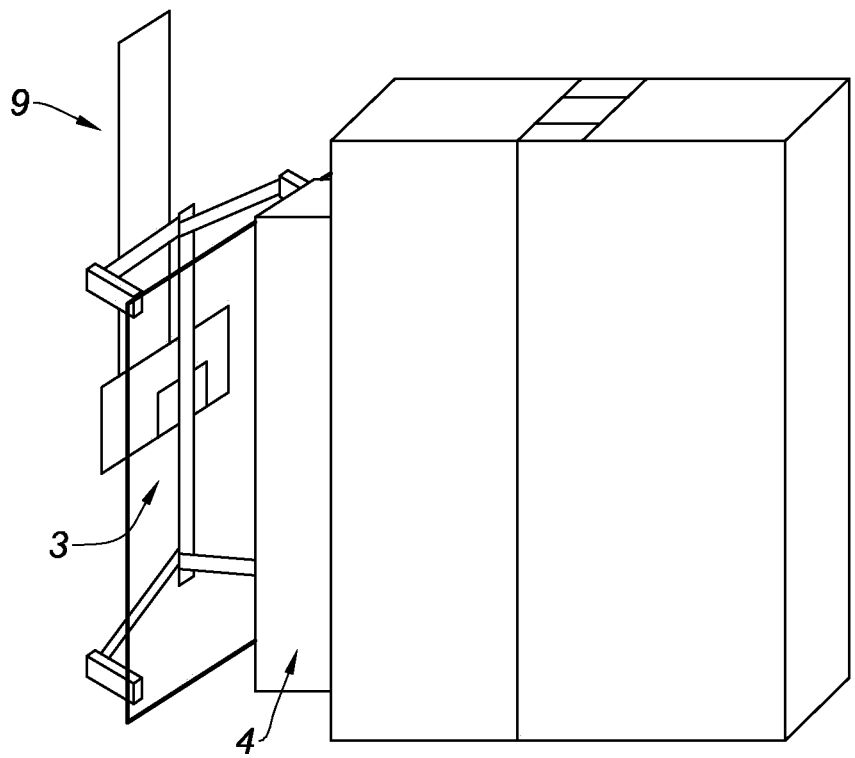
Figure 8:
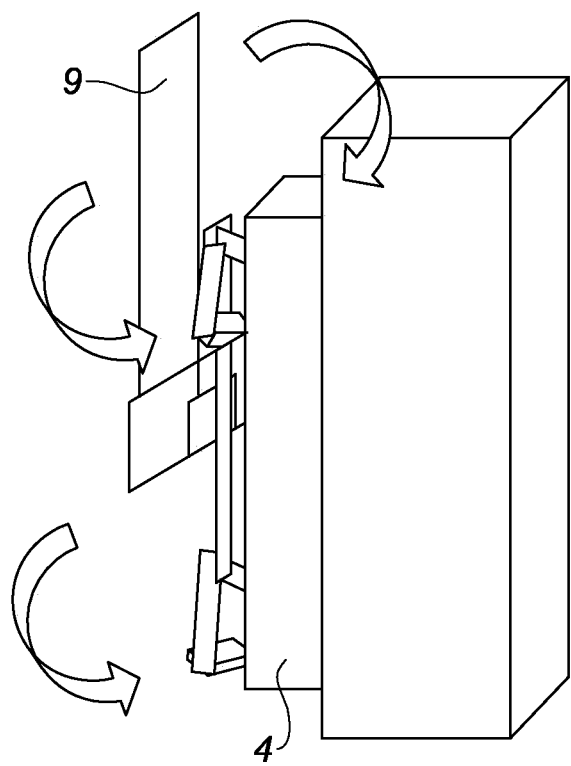

Afterwards, the reinforcing element 3 is placed in the molding tooling as represented in FIGS. 7 and 8.

In other embodiments of the invention, it may be considered that the retention of the reinforcing element 3 is achieved by means other than a pre-glued adhesive, sprayed on the reinforcing element 3 or sprayed on the shell 4.

Indeed, it may be considered to achieve the retention of the reinforcing element 3 by electrostatic means. For this purpose, the reinforcing element 3 may be ionized prior to its set-up against the shell 4.

The reinforcing element 3 may also be retained by electromagnetic means. For this purpose, the reinforcing element 3 may be provided with a primer charged with metal particles and the tooling can be provided with electromagnetic elements which ensure the retention of the reinforcing element 3 against the shell 4.

The reinforcing element 3 achieves a drape-molding which may extend over the entire shell that will form the technical face A. A point that is important to be noted is that the shell 4 that will form the technical face A is provided with imprints which will themselves form the ribs and other staple holders of this technical face A. The reinforcing element 3 is deposited overhang of these impressions. In other words, the reinforcing element 3 is affixed and is held by the adhesive on the shell forming the technical face A while covering the imprints that form the technical members: ribs and fastening members.

The reinforcing element 3 is accurately and repeatedly positioned, for example, by a robot arm 9 and remains in position in the tooling by the adhesive 10 with which it is coated. Moreover, it may be noted that the reinforcing element 3 can be positioned on complex shapes because it is directly affixed to the shapes in question and thus avoids the need for mechanical retaining means.

Alternatively, the adhesive is sprayed directly on the surface of the shell and the reinforcing element 3 is then positioned on the shell and is held in position by the adhesive.

Afterwards, the tooling is closed by bringing the two shells 4 and 5 close to each other and the plastic material is injected into the molding cavity, bearing in mind that the reinforcing element 3 is held against the surface of one of the shells by the adhesive 10. It may be noted that the tooling is devoid of any specific equipment such as needles or other to ensure holding of the reinforcing element in place. During the injection, the reinforcing element 3 which is held in place by the adhesive 10 does not fold nor does it migrate beyond the technical face by the effect of the injection of the plastic material.

In this respect, the method according to the invention differs from the techniques of the prior art in which a reinforcing layer is held by mechanical means which create tensions in the reinforcing layer which prove to be deleterious for the final quality of the part.

During injection, the plastic material passes through the reinforcing element 3. This is made possible by the fact that the reinforcing element 3 is porous and does not prevent the plastic material from passing through the meshing thereof. This is particularly important because the plastic material in the molten state can thus pass through the reinforcing element to fill the cavities that form the ribs and other staples holders that are drape-molded by the same reinforcing element.

After injection of the plastic material, the shells are separated and the interior trim part 1 is ejected. The interior trim part 1 thus obtained does not require any type of cutting or shaving recovery operation.

During the injection of the plastic material, the adhesive disintegrates and does not create fouling or pollution of the tooling.

It should be noted that the same tooling can indifferently make parts with a reinforcing element or parts without any reinforcing element because the tooling is not impacted by the presence or absence of a reinforcing element in the part.

The invention thus provides a method for making a complex part made of a plastic material which incorporates a reinforcing element.

The part thus formed has an impact resistance which, with equal mass, is very substantially improved.

Hence, this method is particularly but not exclusively intended for the manufacture of automotive parts that are likely to experience significant stresses such as interior trim parts masking airbags but also parts such as degassing boxes, air distributor, oil sump . . . .

Of course, the invention is not limited to the embodiment described hereinabove as a non-limiting example but encompasses all variants thereof.

The invention claimed is:

1. A method for manufacturing a part made of a plastic material having a first technical face and a second face, in a tooling comprising a first shell for forming the first face, the first shell provided with imprints for forming technical members of the first technical face and a second shell intended for forming the second face, the first shell and the second shell delimiting a cavity forming the part, wherein the method comprises the following steps of:
   providing a porous reinforcing element that comprises a woven textile having an opening coefficient of 50%, wherein the woven textile is a polyamide-based textile having a basis weight of about 60 g/m$^2$;
   drape-molding the porous reinforcing element on the first shell, the reinforcing element covering a surface of the first shell as well as the imprints that are used to form the technical members;
   retaining the porous reinforcing element on the first shell in a non-mechanical fashion;
   bringing the first shell and the second shell close to each other;
   injecting a plastic material to fill the cavity, the plastic material passing through the porous reinforcing element as it fills the imprints in order to form the technical members;
   separating the first and second shells and; and
   ejecting the plastic part.

2. The method for manufacturing a part made of a plastic material according to claim 1, wherein the retaining of the porous reinforcing element is achieved by an adhesive interposed between the porous reinforcing element and the first shell.

3. The method for manufacturing a part made of a plastic material according to claim 2, wherein the adhesive is deposited over the porous reinforcing element, the porous reinforcing element being then positioned on the first shell prior to the injecting step.

4. The method for manufacturing a part made of a plastic material according to claim 2, wherein the adhesive is deposited over the first shell, the porous reinforcing element being then positioned on the first shell.

5. The method for manufacturing a part made of a plastic material according to claim 2, wherein the adhesive is pre-glued to the porous reinforcing element, then the porous reinforcing element with the adhesive is being directly positioned on the first shell.

6. The method for manufacturing a part made of a plastic material according to claim 2, wherein the adhesive is formed based on an aqueous adhesive.

7. The method for manufacturing a part made of a plastic material according to claim 1, wherein the retaining of the porous reinforcing element on the first shell is achieved by electrostatic retention of the porous reinforcing element on the first shell.

8. The method for manufacturing a part made of a plastic material, according to claim 1, wherein the retaining of the porous reinforcing element on the first shell is achieved by electromagnetic retention of the porous reinforcing element on the first shell.

9. The method for manufacturing a part made of a plastic material according to claim 1, wherein the second face of the part constitutes its apparent face.

\* \* \* \* \*